June 15, 1926.                                                       1,588,678
P. A. GSTALDER
VEHICLE MUD GUARD PROTECTOR
Filed Sept. 10, 1925          2 Sheets-Sheet 1

Inventor
Paul A. Gstalder
By Lancaster and Allwine
Attorneys

June 15, 1926.

P. A. GSTALDER 1,588,678

VEHICLE MUD GUARD PROTECTOR

Filed Sept. 10, 1925    2 Sheets-Sheet 2

Inventor
Paul A. Gstalder
By Lancaster & Allwine
Attorneys

Patented June 15, 1926.

1,588,678

UNITED STATES PATENT OFFICE.

PAUL A. GSTALDER, OF PITTSBURGH, PENNSYLVANIA.

VEHICLE MUD-GUARD PROTECTOR.

Application filed September 10, 1925. Serial No. 55,544.

The present invention relates to motor vehicles, and particularly to a guard for protecting the mud guards of vehicles.

An object of the present invention is to provide a protector which may be applied to a motor vehicle without marring the appearance thereof and which will prevent the mud guards of the vehicle from being dented, bent or otherwise disfigured from contact with obstacles, such as other vehicles, and which will preserve the original shape and form of the mud guards.

Another object of the invention is to provide a protector of this character which is shaped to the general configuration of the outer edges of the mud guards for protecting their edges throughout and which also embodies bracing features to strengthen and more rigidly support the mud guards on the vehicle.

A further object of the invention is to provide a mud guard protector which is composed of a number of detachably connected parts capable of substitution by new parts when damaged and which afford a substantial support for bumpers or the like when used on the vehicle.

The invention still further aims at the provision of a mud guard protector which may be made of strap metal so that the same may be of light construction and may be economically produced.

The above and various other objects and advantages of this invention will in part be described in and in part be understood from the following detailed description of the present preferred embodiment, the same being illustrated in the accompanying drawings, wherein:—

Figure 1:
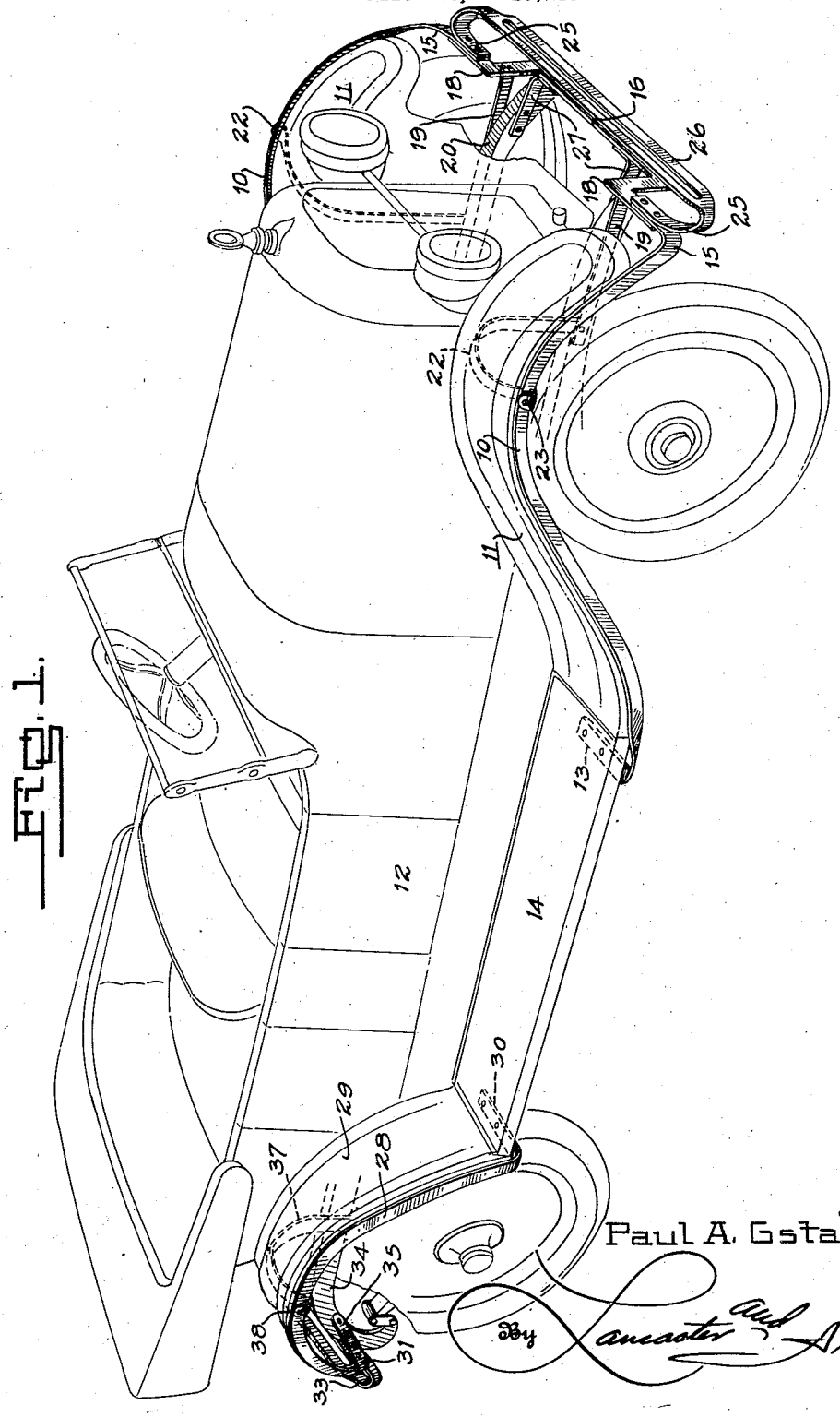
Fig. 1 is a perspective view of a motor vehicle equipped with mud guard protectors constructed according to the present invention.
Figure 2:
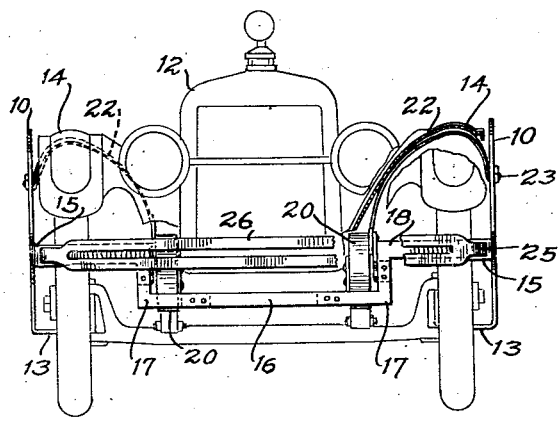
Fig. 2 is a front elevation of the same.
Figure 3:
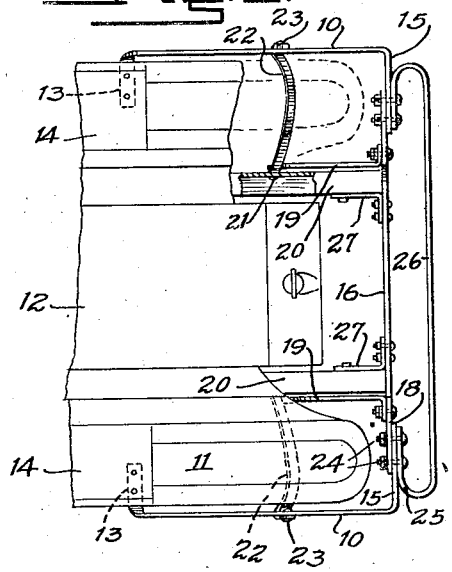
Fig. 3 is a fragmentary top plan view of the forward end of the vehicle with the protectors applied thereto, parts being shown in section.

Referring to the drawings 10 designates a pair of front mud guard protectors which are formed from flat or strip metal curved in an edgewise direction to the curvature of the front mud guards 11 of the vehicle 12. Each protector 10 follows the contour and length of the mud guard 11 from end to end, and the rear end of the protector 10 is bent laterally inward to provide a flat attaching arm 13 which is riveted or otherwise suitably secured beneath the forward part of the running board 14 of the vehicle. The forward end of the protector 10 is also bent laterally inward to provide a second arm 15 for supporting the protector. The arms 13 and 15 are axially twisted or bent so as to lie in planes which are substantially at right angles to each other so that the arm 13 may lie flat beneath the running board 14, and the arm 15 may lie in a vertical plane across the forward end of the mud guard 11.

The forward arms of the protectors 10 are connected together by a cross brace 16 carried at the front of the vehicle to support the forward ends of the protectors 10. The cross brace 16 comprises a flat bar having angle or corner irons 17 secured to its opposite ends with the free ends of the corner irons 17 extending upwardly and thence outwardly at right angles to provide upper supporting arms 18 to which braces 19 are attached. The braces 19 are positioned against the outer sides of the horns 20 of the vehicle and are bolted or otherwise suitably secured at 21 thereto. The inner ends of the braces 19 carry upwardly and outwardly arched brace arms 22 which conform in curvature to the transverse curvature of the mud guards 11 and which are adapted to lie against the undersides thereof, and are suitably secured at their outer ends to the intermediate portions of the protectors 10. Bolts or rivets 23 may be used for securing the braces 22 to the protectors 10. The upper arms 18 of the cross bar are secured by bolts 24 or the like to the inturned arms 15 of the mud guard protectors 10 for rigidly supporting the latter, and the inturned ends 25 of a bumper 26 may be also secured in superposed relation upon the arms 15 by the bolts 24.

The bumper 26 and the protectors 10 are thus detachably connected together so that these parts may be easily removed for repair or substitution. The cross brace 16 is also secured to the inner sides of the horns 20 of the vehicle frame by angle irons 27 which are bolted to the lower portion of the brace 16 and which are curved upwardly therefrom against the inner sides of the horns 20 and bolted or otherwise suitably secured thereto.

The front mud guard protectors 10 are therefore secured to the vehicle and are interbraced, and are also reinforced by the front bumper 26.

The vehicle is also provided with a pair of rear protectors 28 for the rear mud guards 29. The protectors 28 are also of flat strap metal and are curved in an edgewise direction to conform to the curvature of the rear mud guards 29 and have the inturned flat arms 30 secured against the under sides of the running boards 14 at their rear ends. The rear ends of the protectors 28 are provided with inturned arms 31 which are bolted as at 32 to the returned ends of a rear bumper 33 to interbrace the protectors 28 and support the bumper 33.

Figure 4:
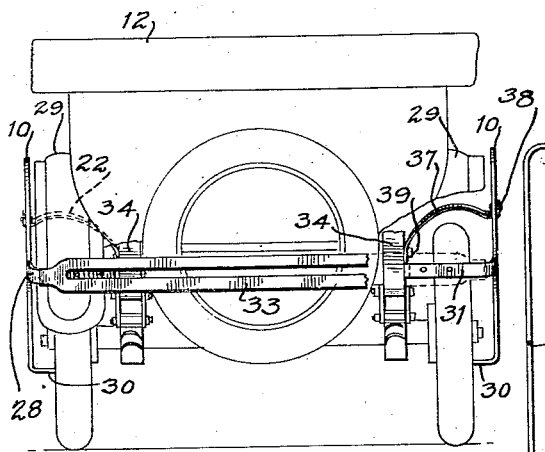
Fig. 4 is a rear elevation of the vehicle with the mud guard protectors applied thereto.
Figure 5:
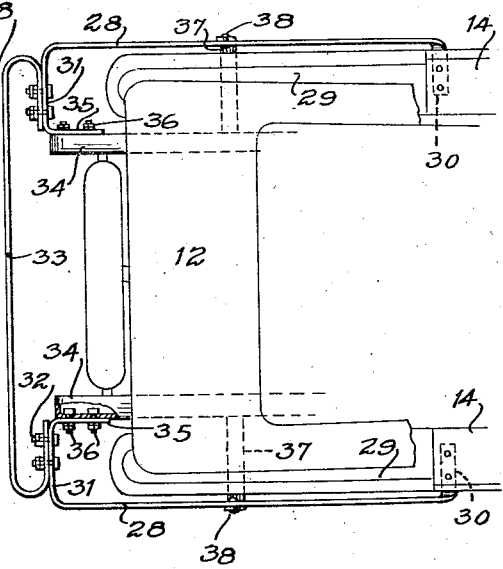
Fig. 5 is a fragmentary top plan view of the rear end portion of the vehicle with the rear mud guard protectors thereon.
Figure 6:
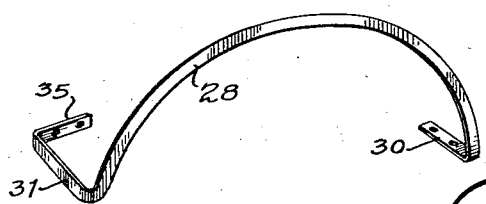
Fig. 6 is a detail perspective view of one of the rear mud guard protectors.

The rear ends of the protectors 28 are attached to the side bars 34 of the vehicle by forward extensions 35 which form continuations of the inner extremities of the arms 31 and which are detachably secured by bolts 36 to the frame bars 34 as shown to advantage in Fig. 5. The rear protectors 28 also have intermediate braces 37 which are secured at their outer ends, at 38 to the intermediate portions of the rear protectors 28, and which are given a curvature corresponding to the transverse curvature of the rear mud guards 29 and lie against the undersides thereof to strengthen the same. The inner lower ends of the rear braces 37 are secured by bolts 39 or the like to the frame bars 34 as shown in Fig. 4.

It will thus be seen that the protectors 10 and 28 follow the outline configurations of the front and rear mud guards 11 and 29 and are so secured to and braced upon the frame or main part of the vehicle 12 that the attachment does not mar or change the appearance of the vehicle yet at the same time the protectors are always in position to receive impact which would otherwise be imposed directly upon the mud guards and other adjacent parts of the vehicle.

The structure is such that the front and rear bumpers 26 and 33 may be removed and the protectors used without the bumpers. Further, the parts are so removably secured together that the protectors may be individually removed for repair or replacement should the same be damaged, or should occasion arise to gain access to parts of the vehicle. The structure of the protector is such as to admit of fanciful design and coloring so as to lend to the asthetic appearance of the vehicle rather than to detract from its appearance as is the case with the ordinary brace attachment.

It is of course understood that various changes and modifications may be made in the details of construction and design of the above specifically described embodiment of this invention, such changes and modifications being restricted only by the scope of the following claims.

What is claimed is:—

1. A mud guard protector for vehicles comprising a curved bar shaped to the configuration of the outer edge of a mud guard and having at opposite ends laterally bent arms extending in the same direction for attachment to the vehicle to support the bar along the outer edge of the mud guard.

2. A mud guard protector comprising a bar bent lengthwise to the configuration of the outer edge of a mud guard, and flat arms bent laterally in the same direction from the opposite ends of the bar, the arm at the rear end of the bar being twisted into horizontal position for attachment to the running board of the vehicle and the arm at the forward end of the bar being twisted into a vertical plane for attachment to the forward end of the vehicle.

3. A mud guard protector comprising a flat bar bent in an edgewise direction to conform to the outer edge of a mud guard and provided at opposite ends with inwardly bent arms twisted into planes at substantially right angles to each other, the arm at the inner end of the bar being adapted for attachment to the running board of a vehicle, and attaching means on the inner end of the other arm for securing the same to the end portion of the vehicle.

4. A mud guard protector comprising front and rear pairs of bars curved to the configurations of the front and rear mud guards of a vehicle, said bars having inturned arms at their opposite ends for attachment to the vehicle for supporting the bars at the outer edges of the mud guards, and front and rear bumpers secured at opposite ends to the outer arms of the bars for interbracing the bars of each pair.

5. A mud guard protector for vehicles comprising a bar curved longitudinally to conform to the outer edge of a mud guard and having its opposite ends bent inwardly for attachment to the vehicle to support the bar along the outer edge of the mud guard, and an intermediate brace connected at its outer end to an intermediate portion of the bar and bent to the configuration of the transverse curvature of the mud guard to lie there against, the inner end of said brace being extended for attachment to the frame of the vehicle.

6. A mud guard protector comprising pairs of front and rear bars curved to the configuration of the outer edges of the front and rear mud guards, said bars having inturned arms at opposite ends, the arms at the inner ends of the bars being adapted for attachment to the running boards of the vehicle, a transverse brace secured to the outer arms of the forward pair of bars, means for securing the brace to the vehicle frame, means for securing the outer arms of the rear pair of bars to the vehicle frame, and front and rear bumpers secured across the outer arms of both pairs of bars.

7. A mud guard protector for vehicles comprising a front pair of bars curved to the configuration of the outer edges of the front mud guards, inwardly extending arms on the inner ends of the bars for attachment to the running boards of the vehicle, inwardly extending arms on the outer ends of the bars, a transverse brace having upwardly offset upper arms detachably connected to said inturned arms at the outer ends of the bars, braces secured to the outer sides of the frame of the vehicle and to said cross brace, angle irons secured between the inner sides of the frame of the vehicle and the cross brace, and a bumper having inturned opposite ends secured to the inturned arms at the forward ends of the bars.

8. A mud guard protector for vehicles comprising a bar curved longitudinally to conform to the outer edge of a mud guard and having its opposite ends bent inwardly for attachment to the vehicle to support the bar along the outer edge of the mud guard, and an intermediate brace connected at its outer end to an intermediate portion of the bar and bent to arch over the vehicle wheel, the inner end of said brace being extended for attachment to the frame of the vehicle.

PAUL A. GSTALDER.